(12) United States Patent
Tutton et al.

(10) Patent No.: US 8,760,145 B2
(45) Date of Patent: Jun. 24, 2014

(54) ELECTRONIC DEVICE FOR DETECTING AN OBJECT BENEATH A WALL SECTION OF INTEREST HAVING A PERSISTENT IMAGE DISPLAY

(76) Inventors: John Charles Tutton, Manotick (CA); Michael Georges Sirois, Ottawa (CA); Robert D. Watters, Ottawa (CA); Joseph Luc Boucher, Ottawa (CA)

( * ) Notice: Subject to any disclaimer, the term of this patent is extended or adjusted under 35 U.S.C. 154(b) by 412 days.

(21) Appl. No.: 13/178,770

(22) Filed: Jul. 8, 2011

(65) Prior Publication Data
US 2013/0010287 A1 Jan. 10, 2013

(51) Int. Cl.
*G01R 19/00* (2006.01)
(52) U.S. Cl.
USPC .................. 324/67; 324/326; 324/228
(58) Field of Classification Search
USPC .......... 324/326, 329, 207.11, 207.22, 207.26, 324/225, 226, 228, 260, 262
See application file for complete search history.

(56) References Cited

U.S. PATENT DOCUMENTS

| | | | | |
|---|---|---|---|---|
| 6,198,271 | B1* | 3/2001 | Heger et al. | 324/67 |
| 7,902,992 | B2* | 3/2011 | Hunter | 340/664 |
| 8,277,071 | B2* | 10/2012 | Anglikowski et al. | 362/147 |
| 2010/0097212 | A1* | 4/2010 | Wingate et al. | 340/540 |
| 2011/0292406 | A1* | 12/2011 | Hollenbeck et al. | 356/607 |

* cited by examiner

*Primary Examiner* — Huy Q Phan
*Assistant Examiner* — Dustin Dickinson
(74) *Attorney, Agent, or Firm* — Miltons IP/p.i.

(57) ABSTRACT

An electronic device for detecting an object beneath a wall section of interest has an elongate rectangular base for temporarily mounting to the wall section of interest and for carrying a display panel to display a persistent image of the object. The device can be a two-part device comprising a first part comprising a light projector and a second part comprising a sensor. The device can also be a single part device where the display and the sensor are incorporated into a single body.

19 Claims, 22 Drawing Sheets

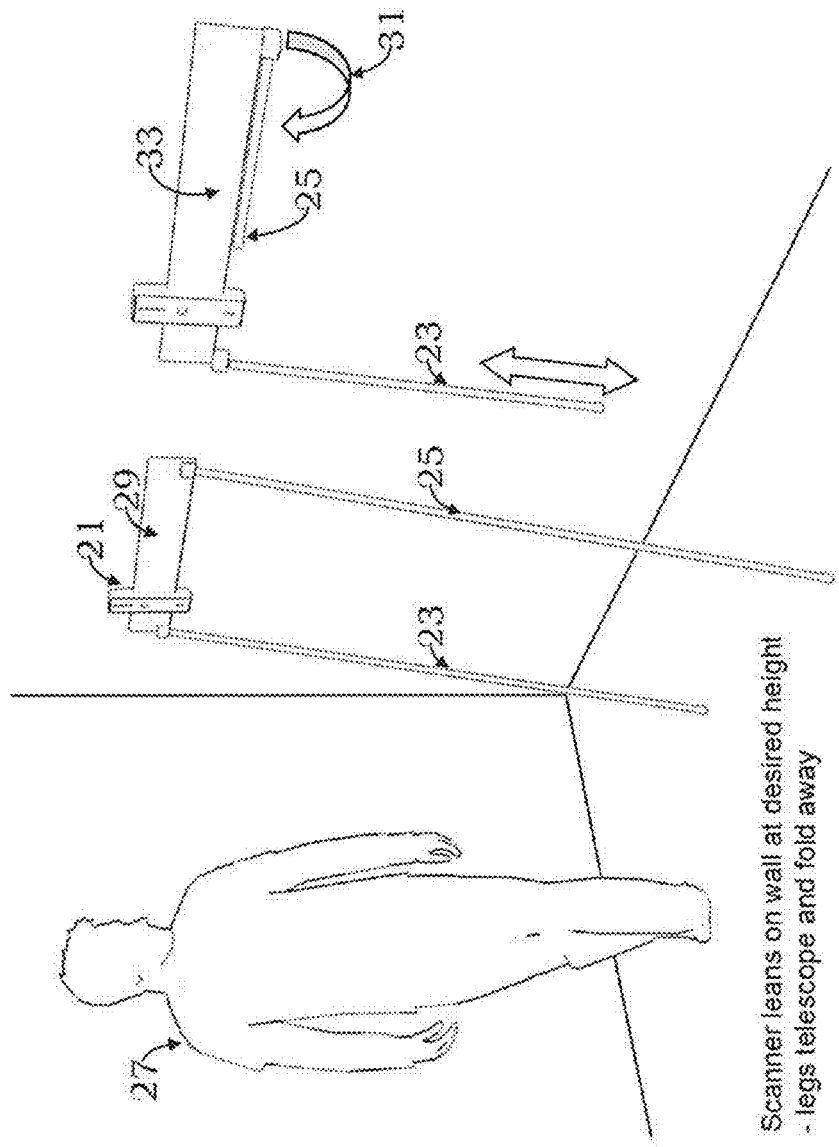

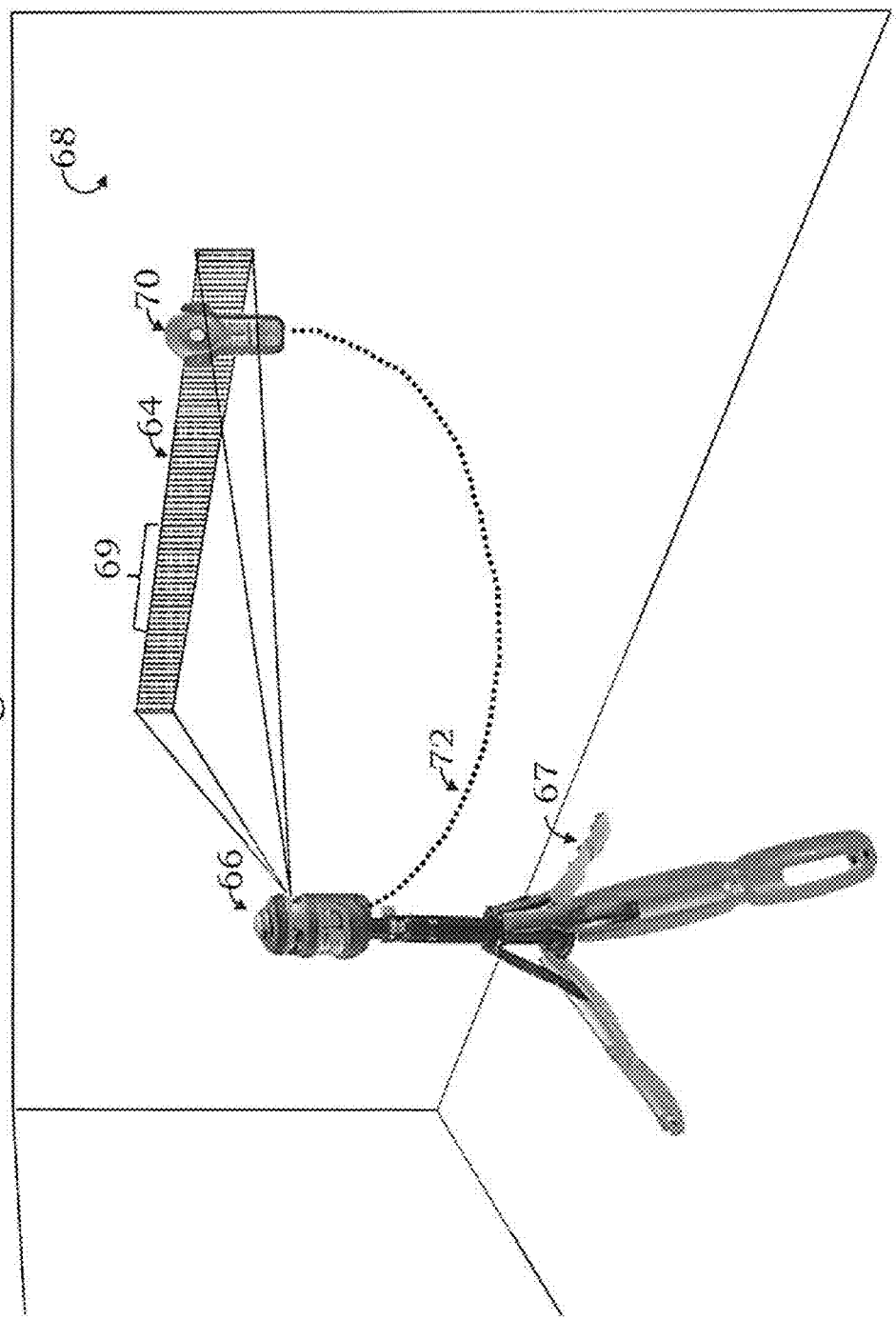

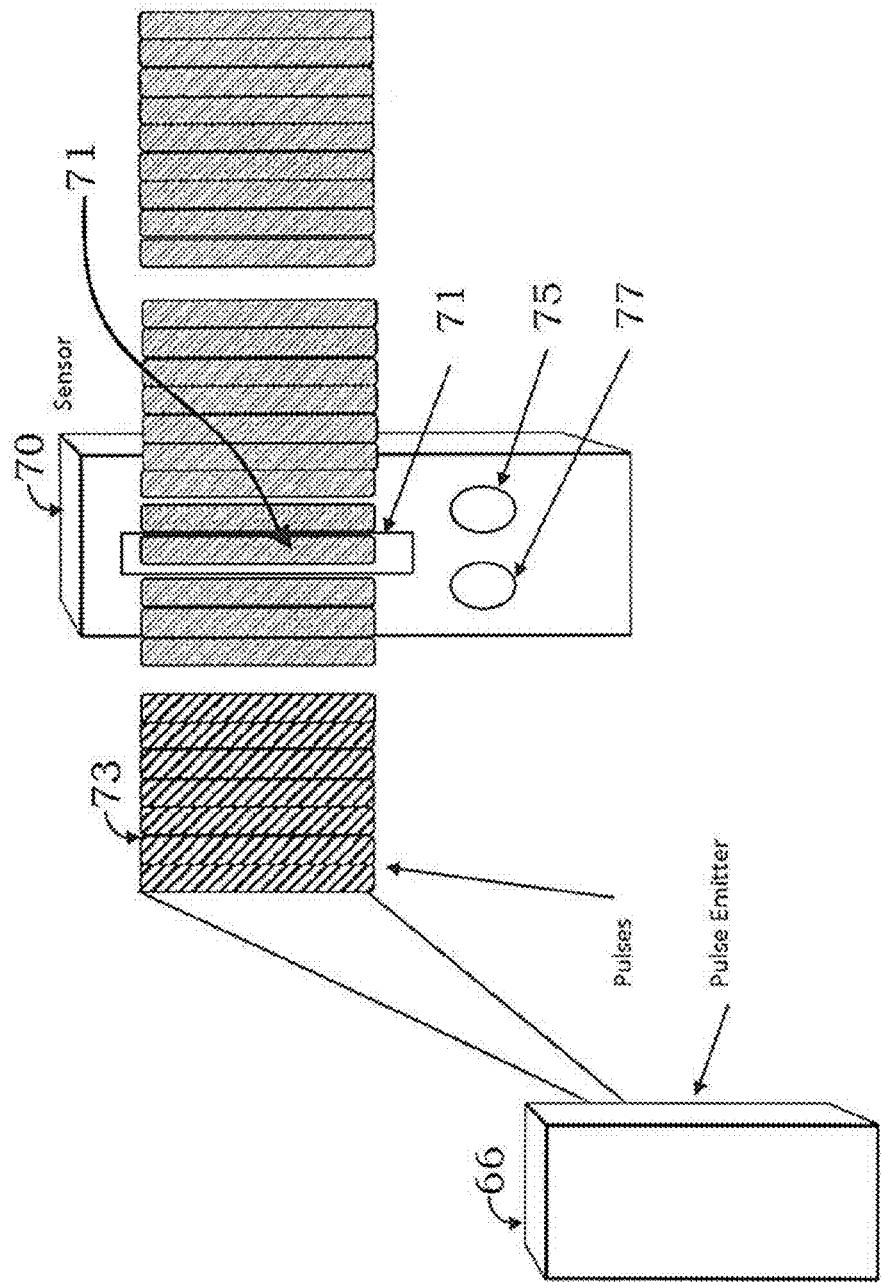

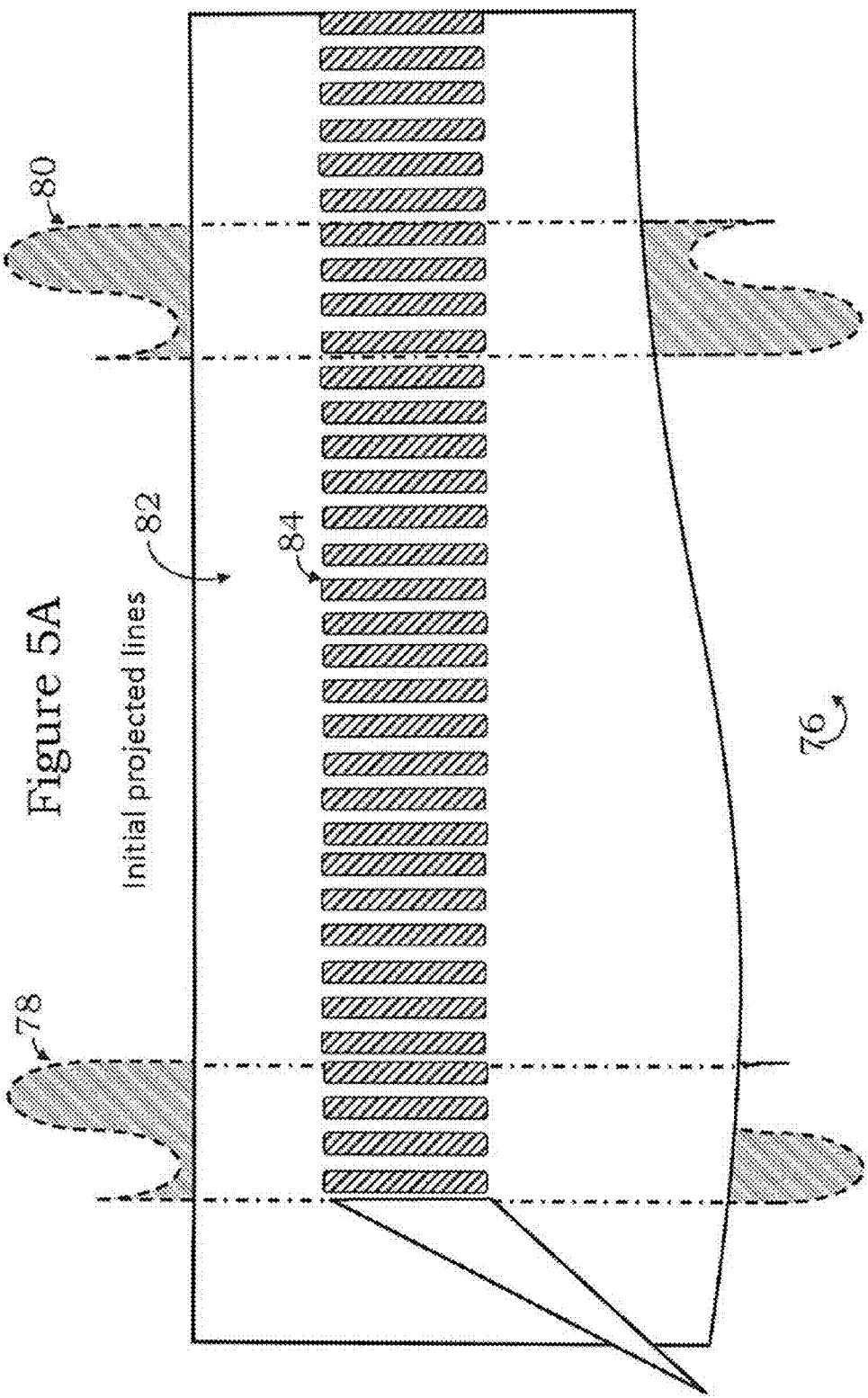

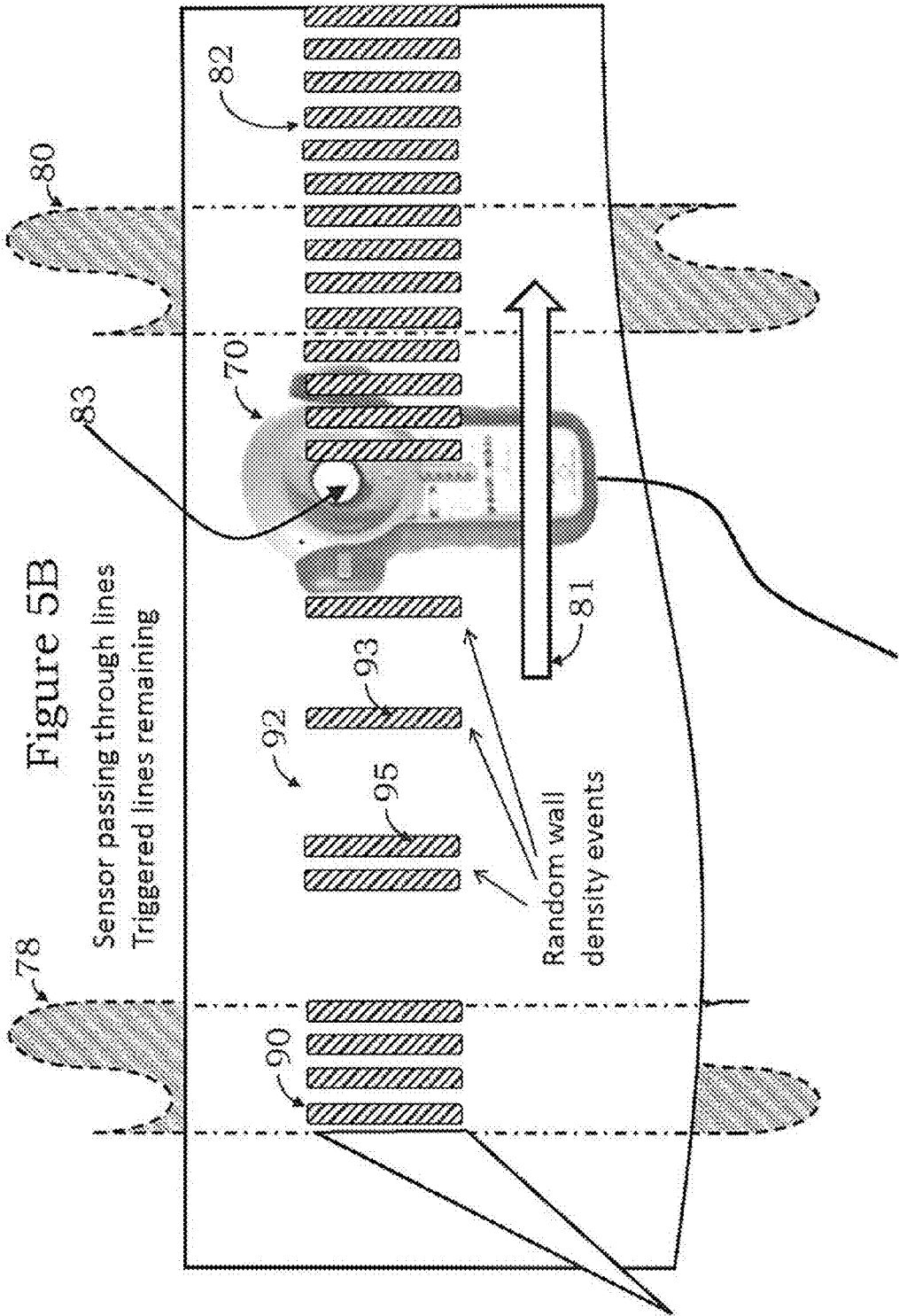

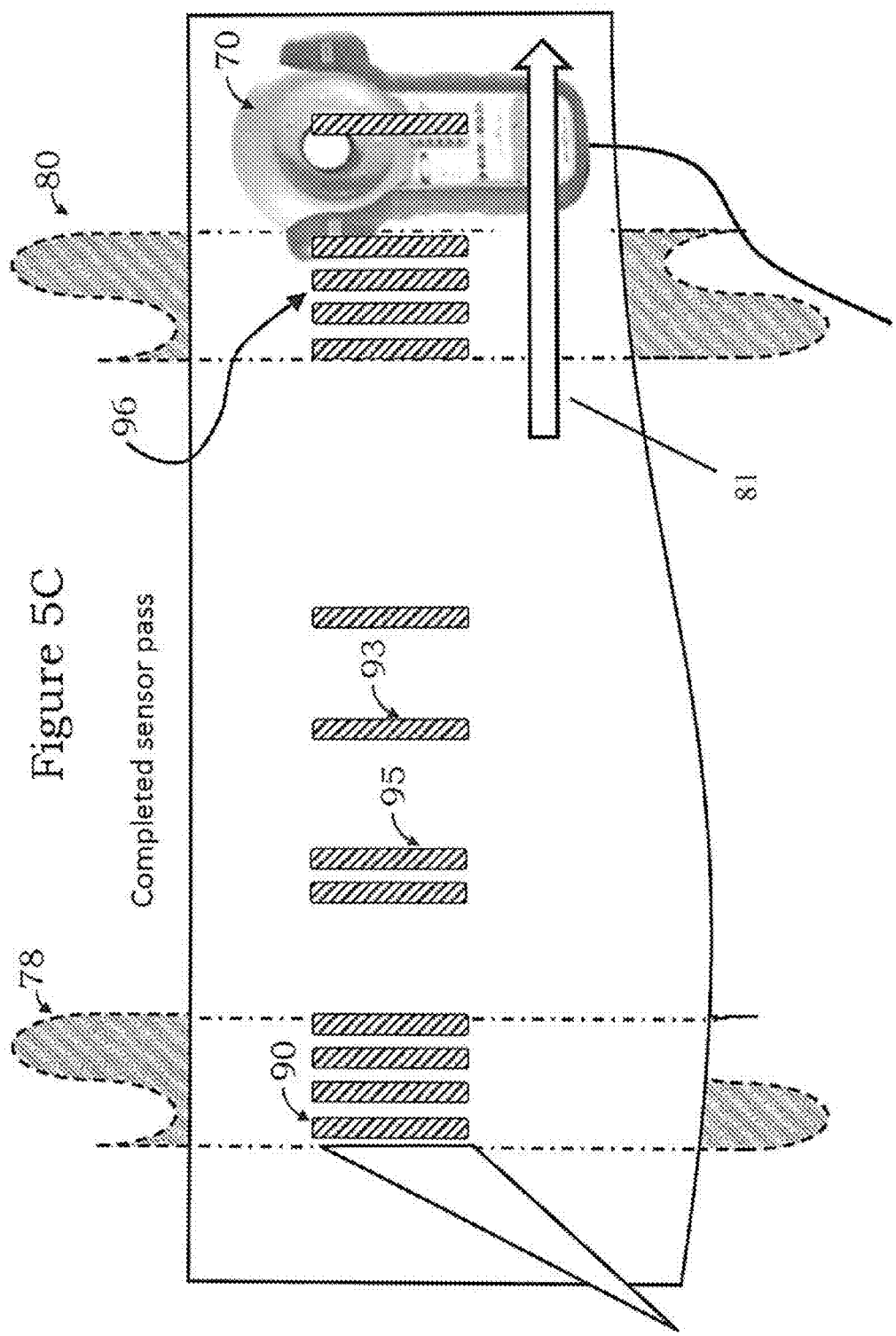

Remaining projected lines showing stud information until projector is reset.

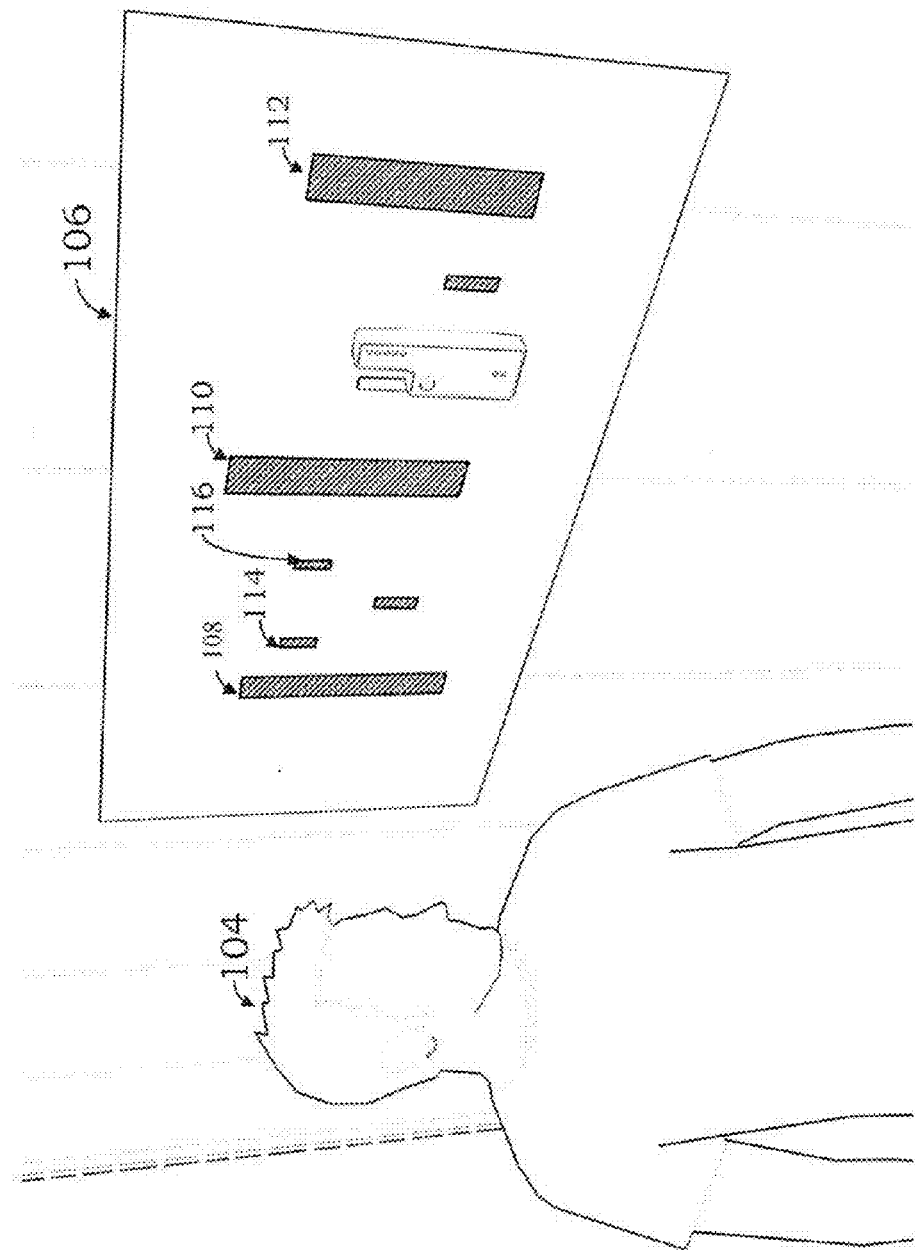

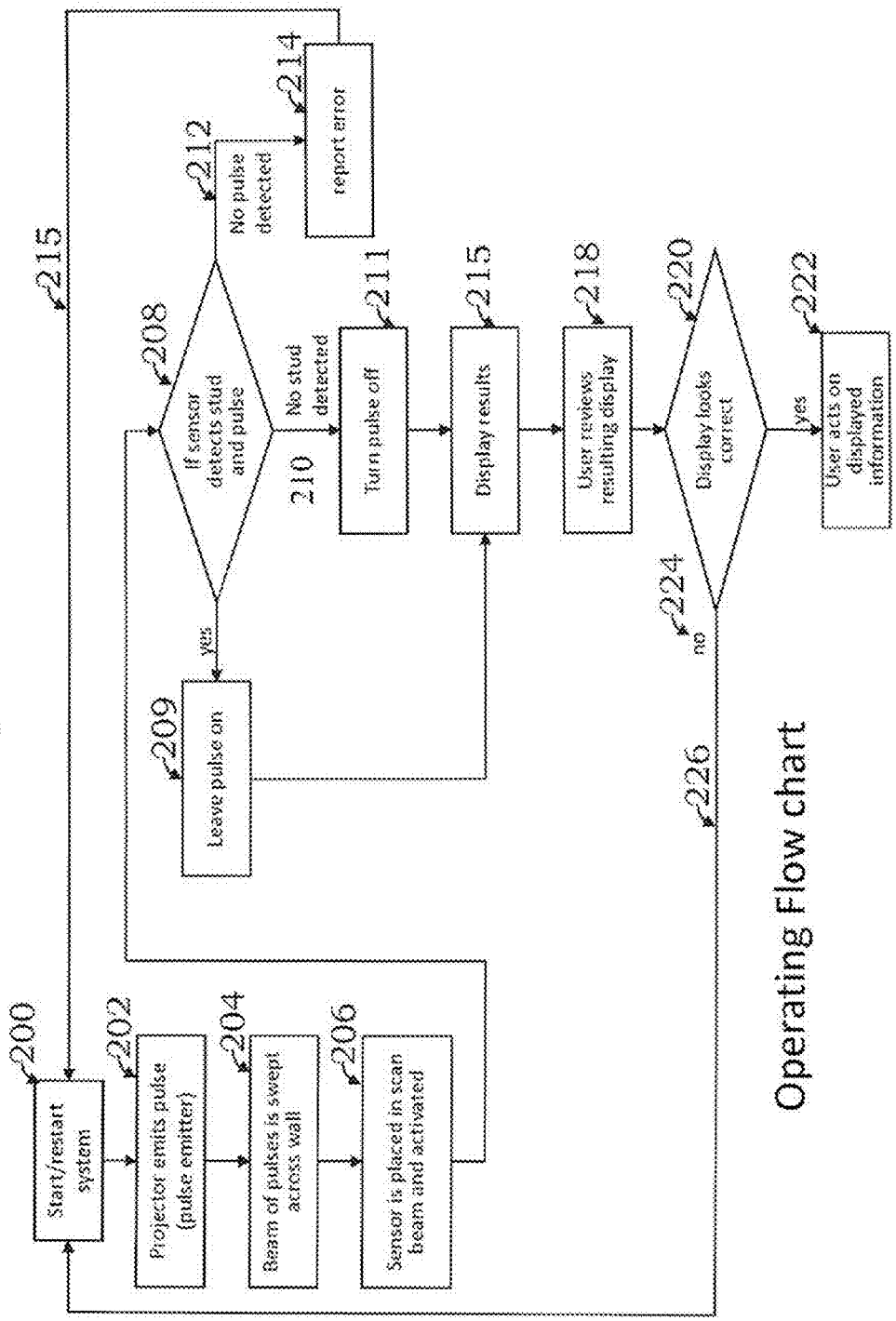

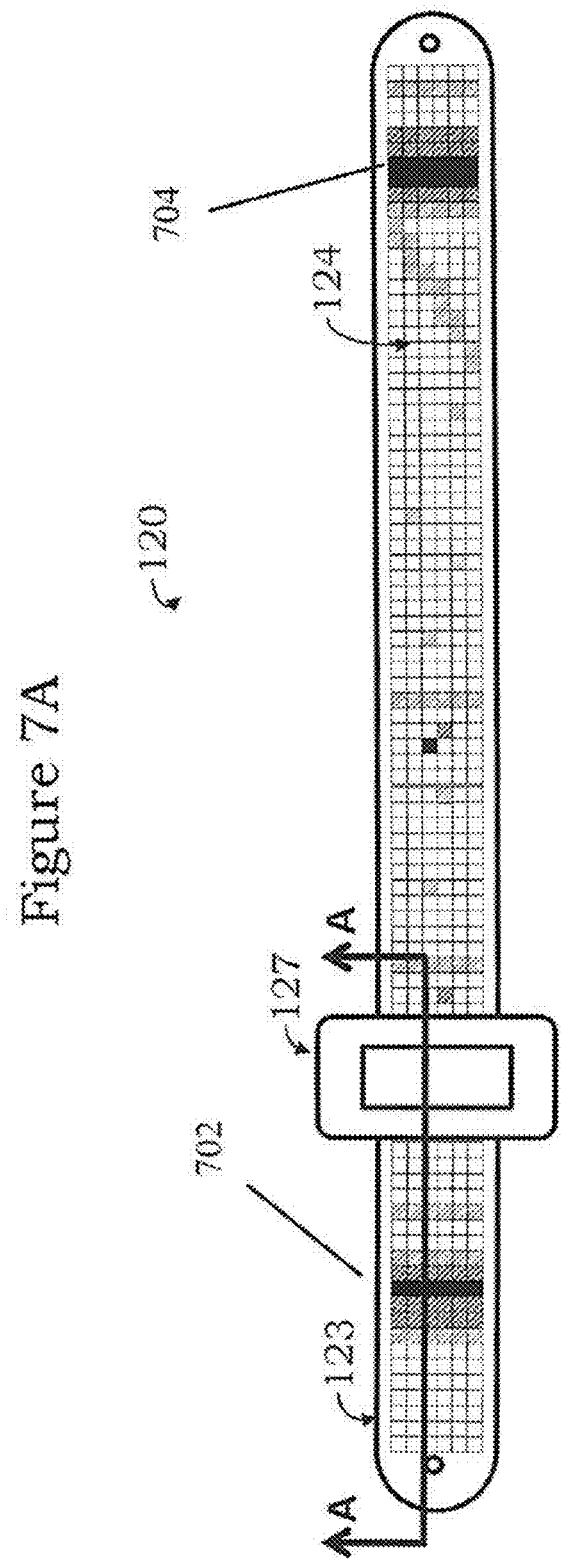

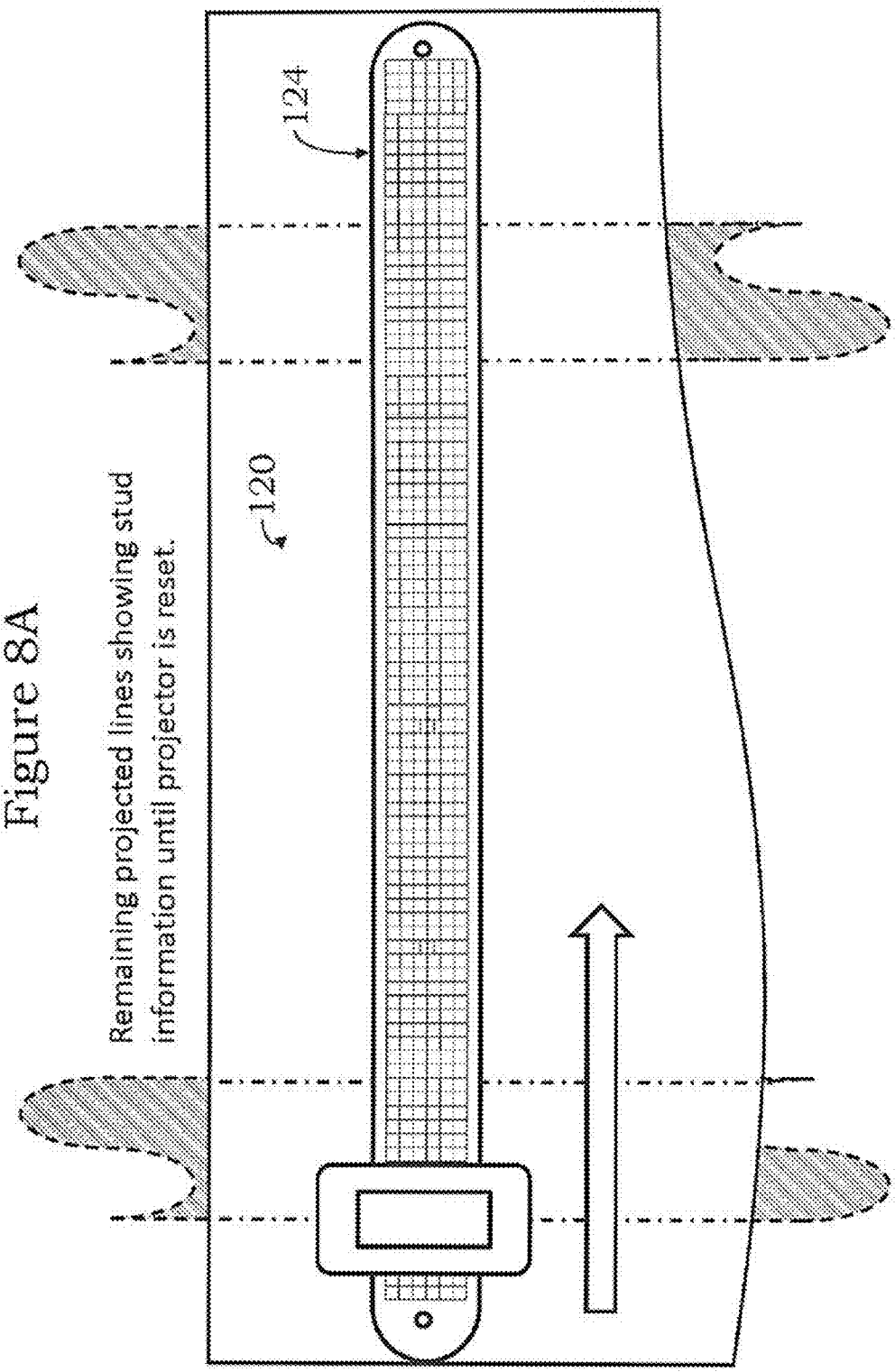

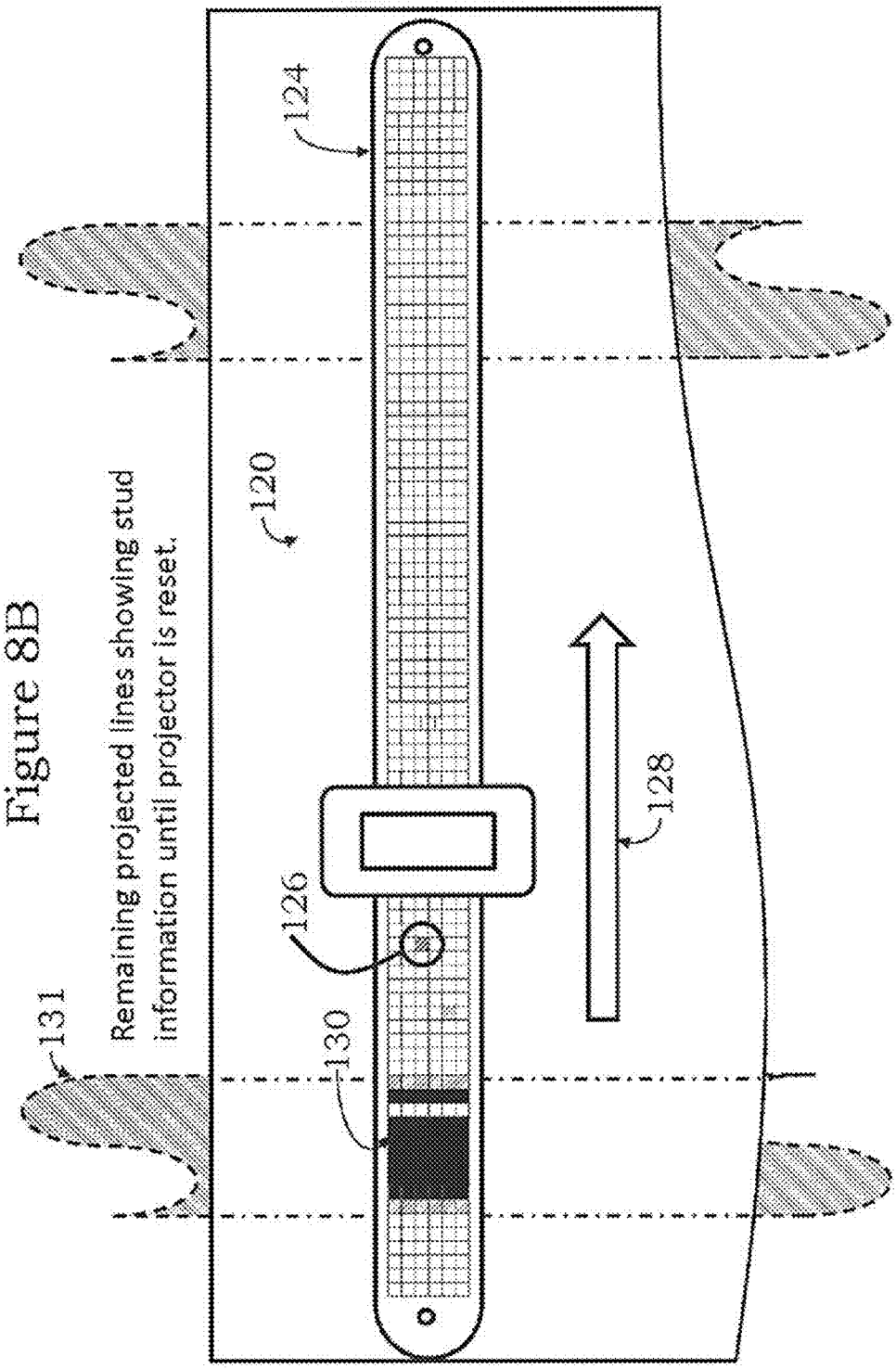

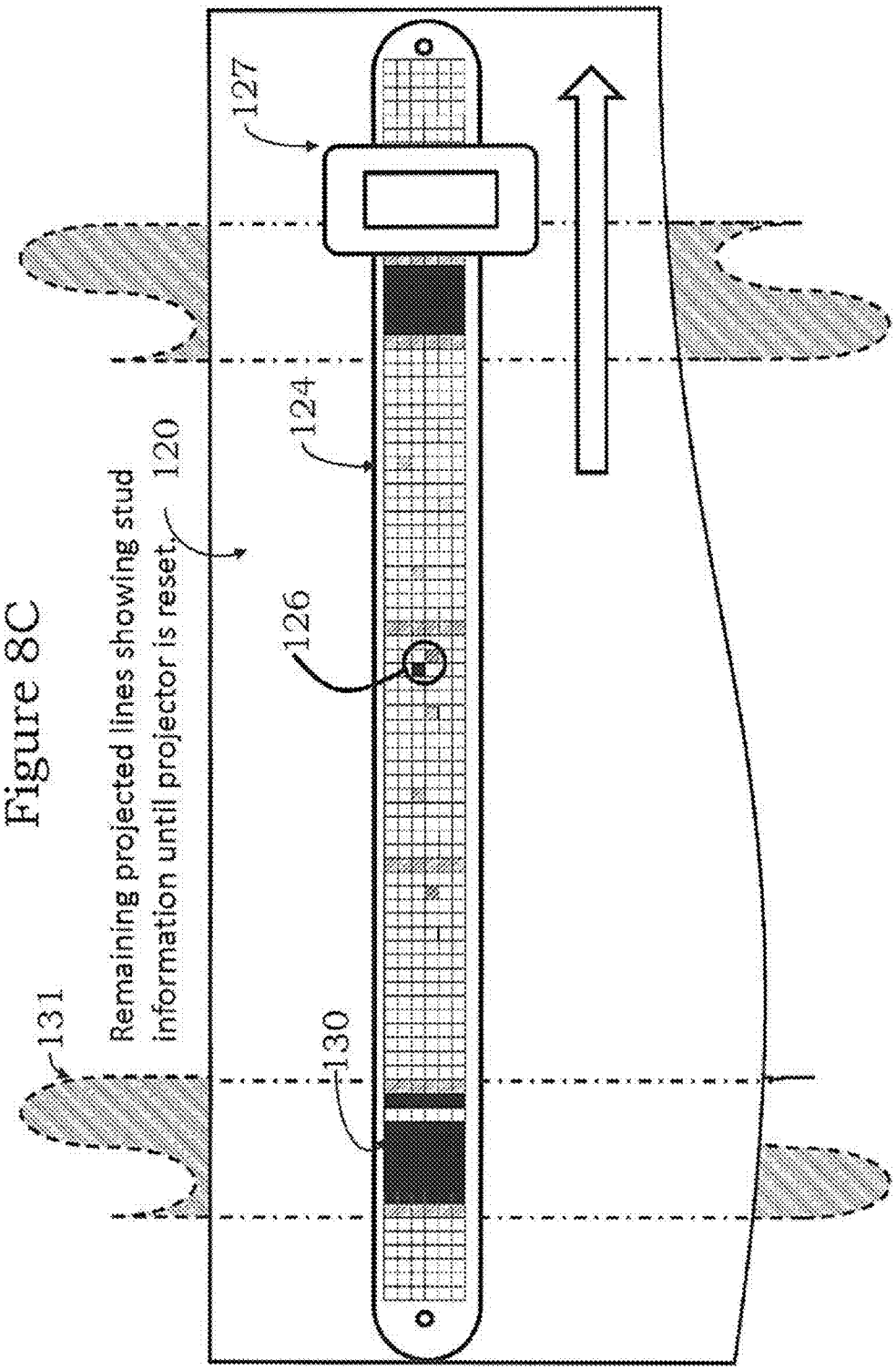

ELECTRONIC DEVICE FOR DETECTING AN OBJECT BENEATH A WALL SECTION OF INTEREST HAVING A PERSISTENT IMAGE DISPLAY

FIELD OF THE INVENTION

The invention pertains to the field of hand-held electronic wall stud detectors. More particularly, the invention pertains to a wall stud detector that creates a full size persistent image on a display medium of the results of what is found by the electronic wall stud detector.

BACKGROUND TO THE INVENTION

Building tradespersons such as carpenters, electricians, plumbers, cabinet installers and the like are often faced with the problem of locating the position of the wall studs or other installed infrastructure behind the installed sheetrock or wallboard forming the wall surface. Such walls are usually formed of the wall studs positioned on 16 inches centers to which are fastened such wall materials as sheetrock or plywood of various thicknesses ranging from ⅛ inch to ¾ inch. After the finishing and painting of the wall, the fasteners, and therefore the wall stud positions, or other installed infrastructure are not visually detectable.

At the present time there are several commonly used methods to locate the position of wall studs. The most fundamental method is to tap the wall with a hammer while listening and attempting to sense a relatively firm sound which occurs when the hammer is tapped directly over a wall stud.

A second and somewhat related method is to drive a nail through the wallboard at positions spaced along a horizontal line until a wall stud is encountered. The former method does not require physical damage to the wall but the latter method is more accurate in indicating the presence and center position of the wall stud.

A third method utilizes a so-called stud finder consisting primarily of a magnet supported in a manner to pivot in the presence of a magnetic material. This finder is moved along the wall surface until it aligns with the head of a fastener holding the wallboard on the stud. The location of these fasteners can be a tedious process. In addition, there is no assurance that the fastener is centrally located on the stud thereby rendering no indication of the actual center line of the stud.

A fourth method is a hand held electronic stud finder that through a capacitance circuit or other means such as a simple radar system senses changes in density of the wall construction and displays the sensor results with a light, audible signal, and/or a marking device showing the edge of the hidden feature. This type of device shows all density changes including minor construction defects and relies on the user to mark the edges of the density changes on the wall to reliably interpret the sensor results. The information shown on the sensors display is real time and is as a consequence transient requiring the user to interpret and record the sensor results usually by manually marking the wall surface.

Other related and combined devices will additionally detect hidden wiring and plumbing features and display the results with a distinct light, audible signal, and/or a marking device enabling the user to locate the hidden wall feature.

Thus it can be seen that previous attempts to locate wall studs or other features have been tedious and time-consuming as well as being frequently inaccurate and only providing the user with information representing a limited area of the wall that is only available in real time and becomes no longer available when the sensor is moved, removed or turned off.

It is the purpose of this invention to provide an improved sensor with a more useful display system for locating and conveying the position of wall studs or similar braces or structural supports or hidden wiring and plumbing features behind wallboard within a wall to user(s).

SUMMARY OF THE INVENTION

A wall stud type scanning device that has the capability of displaying the sensed information on the wall area being scanned as a persistent image is being disclosed.

The scanning device is adapted to be moved along a wall to indicate a change in density of the wall and/or electrical and/or plumbing features thereby to signal the presence of features such as wall studs, wiring and plumbing features within the wall. The sensor is positioned adjacent to or in contact with the wall and a circuit detects any change in the wall density and/or the presence of electrical and/or plumbing features. The sensor display indicates any features detected in the wall in a manner to locate the features behind the wallboard.

The sensor visual display presents a full size image and retains the information from the sensor. Typically the information from low cost currently available wall stud sensors is prone to errors and degradation largely due to user errors and unpredicted variations in wall construction. This invention uses natural human pattern recognition skills to produce reliable and useful information by displaying the overall scan results of the area of interest on the wall. Having the complete picture available lets the user reject minor errors and inconsistent information from the sensor, and reliably recognize the anticipated subsurface wall features such as wall studs and conveniently communicate with others regarding the findings.

The visual display area is longer than the spacing of 2 wall studs (typically 16" centers) to enable the user to reliably locate a pair of wall studs. The visual display panel is adhered or mounted temporarily to the wall surface to retain the panel in place when displaying the image.

In another embodiment of the invention the persistent display information driven by the sensor is projected onto the area of interest on the wall.

In another embodiment of the invention the persistent display information driven by the sensor is printed on the wall.

In another embodiment of the invention the display information driven by the sensor is printed onto a removable adhesive print out.

BRIEF DESCRIPTION OF THE DRAWINGS

FIG. 4 illustrates one embodiment of the invention having two parts.

FIG. 4A illustrates a sensing device of the embodiment of the invention illustrated in FIG. 4.

FIG. 5A illustrates an initial display of one embodiment of the invention.

FIG. 5B illustrates a scanning process.

FIG. 5C illustrates a competed scanning process.

FIG. 6A illustrates a persistent image display of still another embodiment of the invention.

FIG. 6B illustrates a process of one embodiment of the invention.

FIG. 7A illustrates a sensor in sliding relationship with an elongate rectangular base on one embodiment of the invention.

FIG. 8A illustrates a first step in a scanning process using the embodiment of FIG. 7A.

FIG. 8B illustrates a following step in the process of FIG. 8A.

FIG. 8C illustrates a following step in the process of FIG. 8B.

FIG. 9A is a table of various embodiments of the invention.

FIG. 9B is a continuation of the list of FIG. 9A.

DETAILED DESCRIPTION OF VARIOUS EMBODIMENTS OF THE INVENTION

Figure 1:
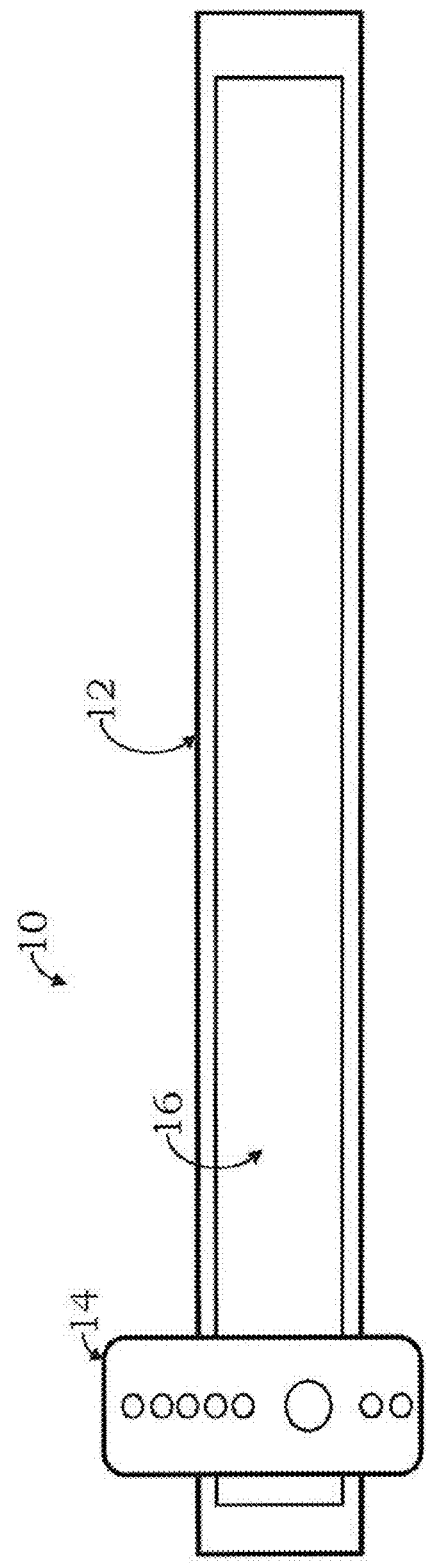
FIG. 1 illustrates one embodiment of the invention.

Referring now to FIG. 1 there is illustrated a front view of one embodiment of the invention (10) comprising an elongate rectangular base such as a combined level and ruler (12) with an electronic persistent image wall stud detector (14) and a display system (16).

Figure 2:
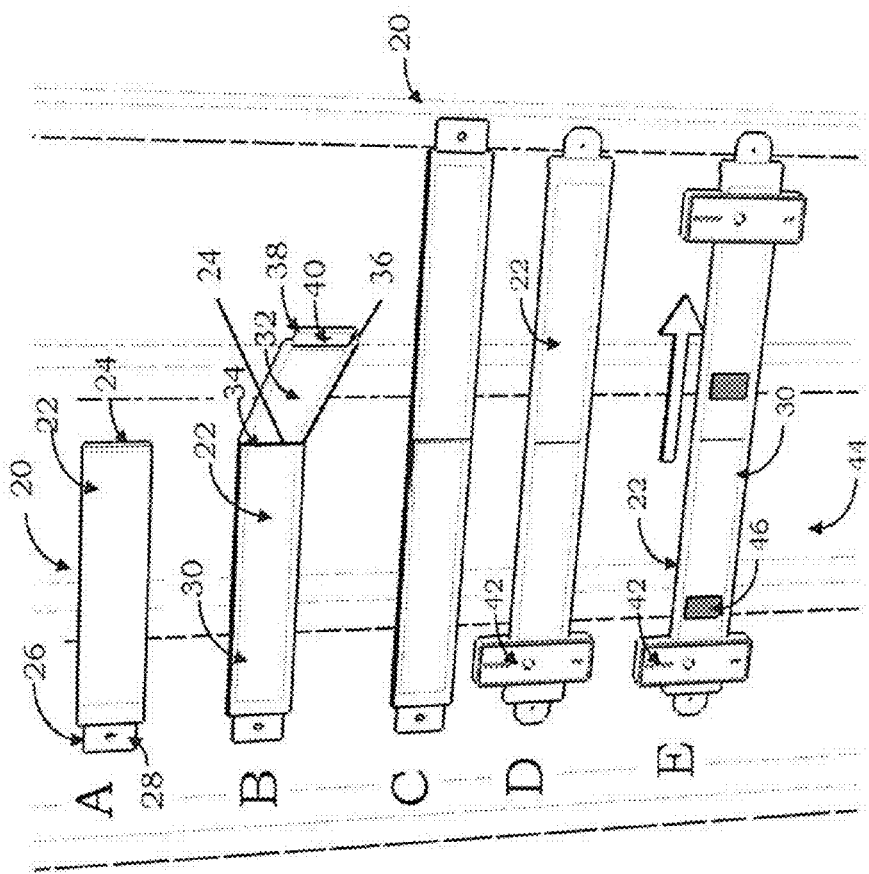
FIG. 2A to 2E illustrate another embodiment of the invention.
FIG. 2F illustrates yet another embodiment of the invention on telescoping legs.

Referring now to FIG. 2A to E there is displayed an alternate embodiment of the invention (20) comprising a folding level & ruler base (22) that folds at a hinge (24). The invention can be suspended on a wall by a suspension tab (26) having an aperture (28) through which a pin or nail can be placed in order to hold the ruler base in position against the wall. In FIG. 2B the ruler (22) folds out to double its length. The unfolded ruler comprises sections (30) and (32) folding on hinge (24). The opposite end of the ruler base (36) comprises a tab (38) having an aperture (40) for suspending the ruler base on the wall as shown in FIG. 2C. Referring to FIG. 2D the invention includes an electronic stud finder (42) that slides along the level & ruler combination (22) and across an area of interest on the wall. Referring to FIG. 2E the stud finder (42) moves across the ruler (22) and as it detects objects of interest behind dry wall (44) it will leave a persistent image (46) on a screen (30). The stud finder comprises conventional detector technology such as a capacitive type sensor with the possible addition of metal, electric wire detectors and plumbing detectors. The stud finder technology is augmented with additional circuitry to create an image on a full size display panel on the folding ruler.

Referring to FIG. 2A the invention 21, in another embodiment, can be suspended from a set of telescoping legs 23 and 25 so that a user 27 is able to view the display panel 29 at a desired height. When not in use, the legs telescope down (31) to a convenient length for folded storage against the base 33. The ruler is sufficiently long to display hidden studs and other objects over a desired scanning area.

Figure 3:
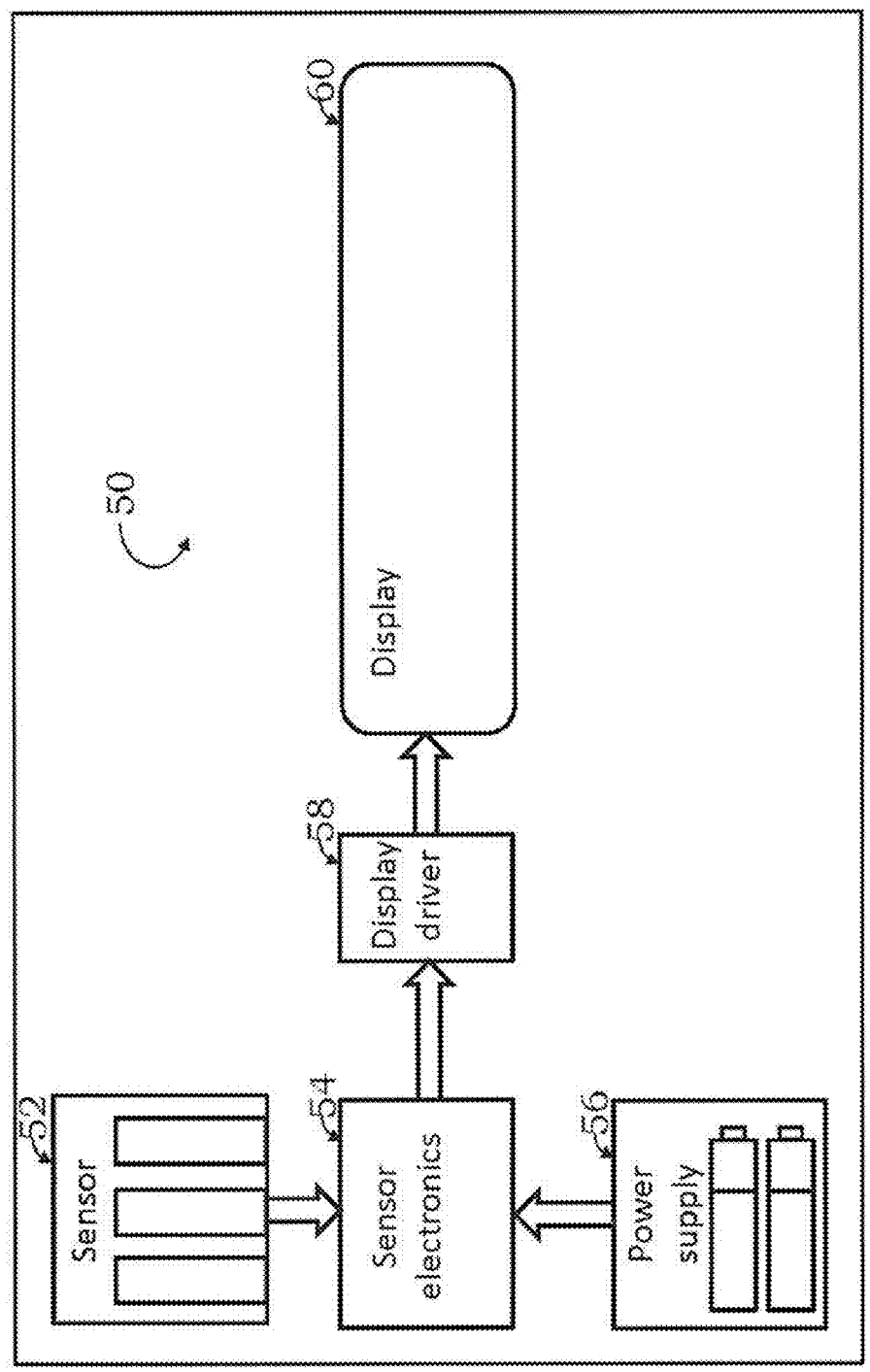
FIG. 3 illustrates a schematic diagram of one embodiment of the invention.

Referring to FIG. 3 one embodiment of the invention (50) can be illustrated schematically as comprising a sensor (52) in communication with an appropriate suite of sensor electronics (54) to convert the detected behind-wall object and convert it into a semi-persistent display and a power supply (56). The sensor will detect the wall stud and the sensor electronics will drive a display driver 58 which will in turn display an image of the hidden behind-wall object on the display screen (60). The display panel will receive a display signal and the image generator will generate an image on the screen that is a persistent image of the detected subsurface wall feature. Rescanning the area of interest, turning off the display power source or moving the invention will reset the display.

As further described below, the display has a number of embodiments, for example, consumable or reusable printed surfaces using a printing technology such as thermal paper, inkjet or similar printing technologies. In another embodiment the image generator will print the image using an inkjet or thermal printer directly on the surface of the wall.

Laser-Based Stud Finder

Referring to FIG. 4 and in a further embodiment of the invention there is a two-part system comprising a projected laser display and a hand-held scanner. The laser emitter projects a pattern against the scanning area of interest. The laser display (64) is projected by a projector/emitter (66) mounted on a tripod 67. The laser pattern 64 is displayed against a wall of interest (68). The laser pattern displayed (64) on the wall is configured as an addressable multi-element projection projecting a series of laser picture elements (69) onto the wall area of interest.

Referring to FIG. 4 and FIG. 4A, the sensor (70) has a detector for the surface behind-wall features and a detector (71) for the laser pulse picture elements (73) emitted by the projector. Features of the sensor (70) include an on button (75) and a reset button (77). When the sensor is passed through the projected elements and when there is no subsurface stud or other detectable feature beneath the wall detected by the sensor the projected element will be turned off. When the sensor detects a subsurface feature and also detects a laser picture element the projected element will be left on. The result is that the wall surface will have a multi-element display of the detected features permanently displayed until such a time as the laser projector is moved, reset or turned off. The sensor communicates with the projector with a hard wired or wireless (RF or IR) link (72) such as ZIGBEE™ or BLUETOOTH™.

Referring to FIG. 5A there is shown a wall surface (76) behind which are two wall studs (78) and (80). The laser projector projects an initial series of laser elements (82) comprising individual elements (84). The display (82) is displayed permanently until the system is moved, reset or turned off.

Referring to FIG. 5B, as the sensor (70) is moved 81 from left to right across the laser image (82) displayed on the wall it detect stud (78). The sensor electronics will detect the incoming laser pulse in window (83) as it passes over the area on the wall that is disposed over the wall stud 78. The sensor will maintain the laser multi-elements (90) projected by the laser emitter over the stud as illuminated. In areas where there are no studs or other sub-wall features of interest, the sensor will extinguish those projected elements (92). Random wall density events may be detected by the sensor and displayed as one (93) or two (95) illuminated elements.

Referring to FIG. 5C the second stud (80) also leaves a persistent display (96) when it is detected by the sensor (70).

Figure 5D:
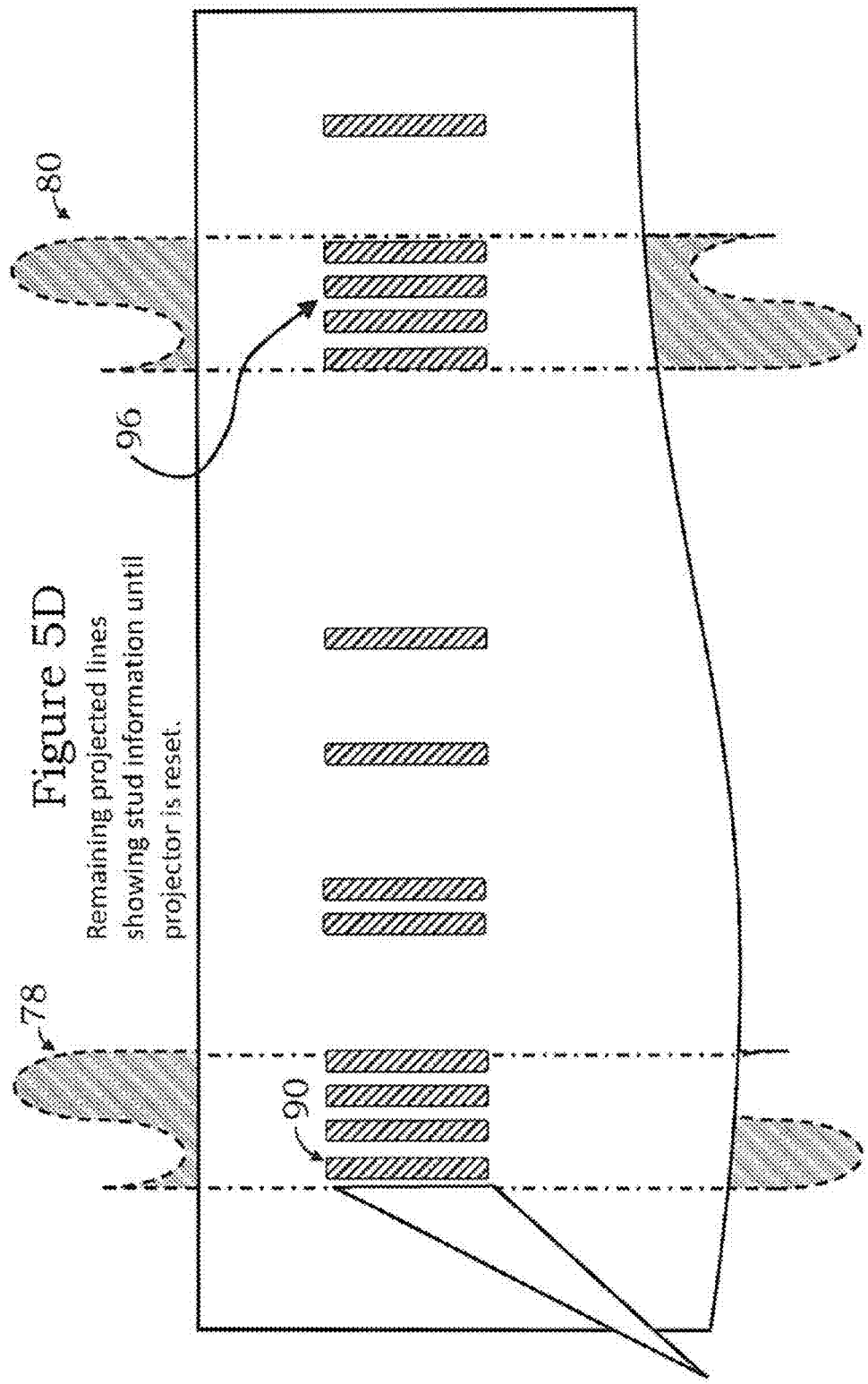
FIG. 5D illustrates a persistent image display of one embodiment of the invention.

Referring to FIG. 5D the image (90) over stud (78) and image (96) over stud (80) will persist for a desired length of time until the projector is turned off, moved or reset.

Advantages of the invention are: the visual display represents a full size image of what is behind the wall and retains the image from the sensor; the invention uses natural human pattern recognition skills to produce more reliable and useful information then current wall stud finders and similar detectors by displaying the overall scan results of the area of interest on the wall; having the complete picture available lets the user reject minor errors and less inconsistent information from the sensor and reliably recognizes the anticipated sub-surface wall feature such as wall studs, wiring and plumbing; the invention records the readings from the stud finder (using the current sensing technology) and displays the image in a persistent manner; the human brain can interpret the displayed image, build confidence in the display and use the displayed data for useful tasks. Other advantages consist of: there are no consumables in the use of the invention; durable, low power consumption; use of lasers is desirable (a hot technology); potential product line extensions; extendable to commercial grade products, easy to use (no training/no manual needed).

Figure 6C:
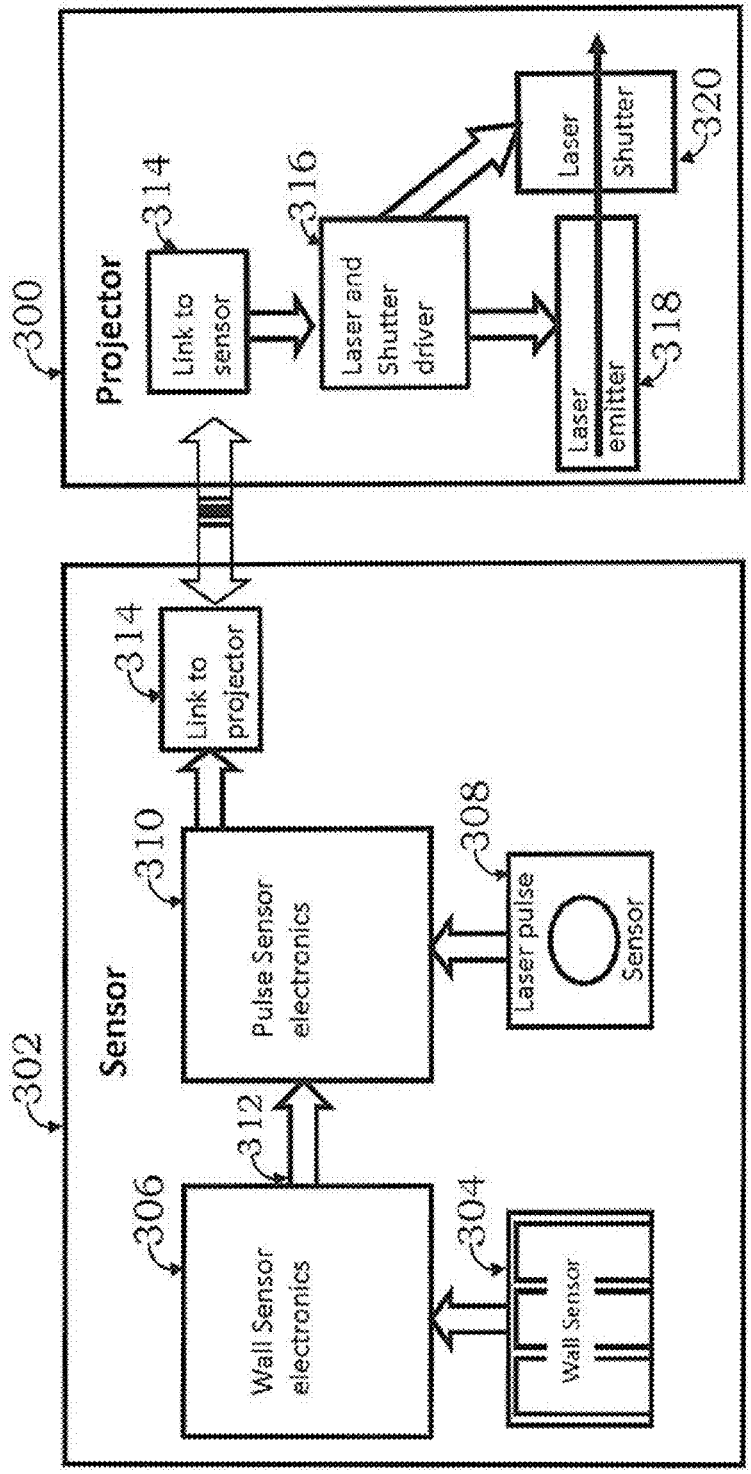
FIG. 6C illustrates a schematic of one embodiment of the invention illustrated in FIG. 4.

This is shown in FIG. 6A where the individual 104 viewing the wall surface of interest (106) is able to clearly see the location and size of the subsurface wall features (108, 110 and 112) while rejecting the signal noise images (114 and 116). Referring to FIG. 6B, and in operation, the laser-based stud finder works like this:

200 Start/restart system;
202 Laser scanner emits pulse (pulse emitter);
204 Beam of pulses is swept across walls;
0.25" wide pulses at 4' wide sweep (48"/0.25"=192 pulses);
206 Sensor is placed in scan beam and activated;
208 If sensor detects stud and pulse then the pulse is left on 209 and displays results 215;
218 user reviews and interprets display;
220 If the display looks valid then the user acts on the displayed information 222;
If the display looks invalid 224 then the user will rescan 226
210 If the sensor detects pulse but no stud the pulse is turned off 211;
212 If the sensor does not detect a pulse then no action;
214 Reset system if result looks wrong and rescan 215;
Basically the system erases pulses where no stud is detected;

Referring to FIG. 6C, the laser-based stud finder is shown schematically as comprising a first part 300 and a second part 302. The first part 300 comprises the laser projector and the second part 302 comprises the sensor. The sensor 302 comprises a wall sensor 304 that is capable of detecting beneath-wall objects. The wall sensor 302 is operatively connected to an electronics package 306 to interpret the signal as a beneath-wall object of interest or a spurious signal. The stud sensor also comprises an optical laser pulse sensor 308 which is operatively connected to a pulse sensor electronics package 310. The wall sensor electronics package and the laser pulse sensor package operate cooperatively 312 to display the presence of a beneath-wall object of interest. The sensor 302 is in communication with the laser projector 300 by way of a hardwire connection 314 or a wireless connection such as BLUETOOTH™ or ZIGBEE™. The signal from the sensor 302 will modulate the laser and shutter driver 316 so that the laser emitter 318 and the laser shutter 320 operate to show a persistent display of the beneath-wall object as a string of illuminated elements or the lack of illuminated elements to show no objects of interest.

Figure 7B:
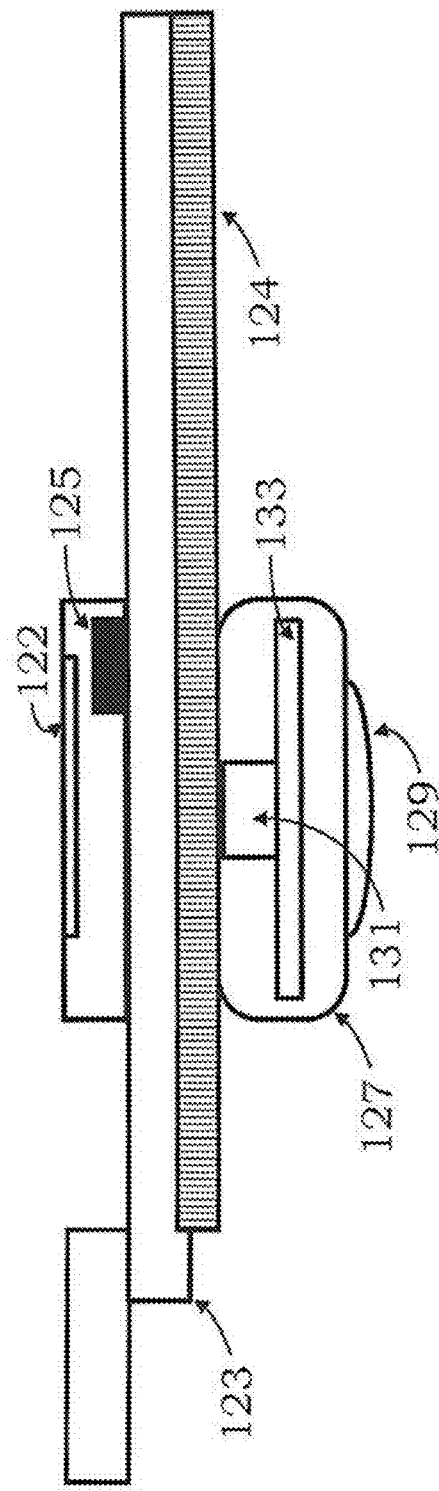
FIG. 7B illustrates cross-section along section A-A of FIG. 7A.

Magnetophoretic-Based Stud Finder. Referring to FIG. 7A and FIG. 7B and in another embodiment of the invention there is disclosed an electronic wall stud detector (120) comprising a sensor (127) that scans over a display panel (124) comprising a magnetophoretic panel that contains a magnetically sensitive material in a gel or in a fluid form. The panel is mounted to a frame 123. When the magnetic field generated by the magnetic coil encounters a sub-wall surface the resulting distortion in the magnetic field will cause the panel (124) to change colour due to the migration of the magnetic particles suspended in the gel or the fluid. This will create a semi-permanent display 702 and 704 of the sub-wall surface. The display can be reset magnetically by reset magnet 125 or mechanically by moving the magnetic particles away from the display surface or by erasing by other means.

Referring to FIG. 7B there is illustrated the invention 120 in partial cross-section about A-A. Housing 127 contains a power source, control switch 129, writing magnets 131 and electronics 133. The writing magnets receive a signal from the sensing coils and will activate to re-orient the magnetic material in the magnetophoretic panel so that a visible trace of the sub-wall objects are shown.

Referring to FIGS. 8A to 8C, the invention 120 there is disclosed an electronic stud detector with multiple magnetic sensors triggering a multiple number of magnetic coils. The display panel 124 is an electrophoretic panel that contains a magnetically sensitive material in a gel or in a fluid form that when exposed to the magnetic field of the sensor changes colour due to the migration of the magnetic particles in the panel. The row of magnetic coils produces a pixelated display 126 of the wall's subsurface features as the sensor is moved 128 across the display panel 124. The resulting display 130 illustrates where the sub-surface wall stud 131 is located. The display will persist until it is reset magnetically or mechanically by moving the magnetic particles away from the displaying surface.

The magnetophoretic-based stud finder operates like this:
Place unit over area to be scanned;
User slides sensor along wall while pushing the 'on' switch;
Sensor detects stud;
Electronics send pulses to magnet array in proportion to sensor signal strength;
Sensor leaves 4 level grey scale images (pixelated) on display 'tape'. Image is persistent;
Image remains where sensor detects stud;
User acts on info on wall: drill hole, hang picture . . . ,
Slide back to reset display (magnet on back erases image).

Figure 9A:
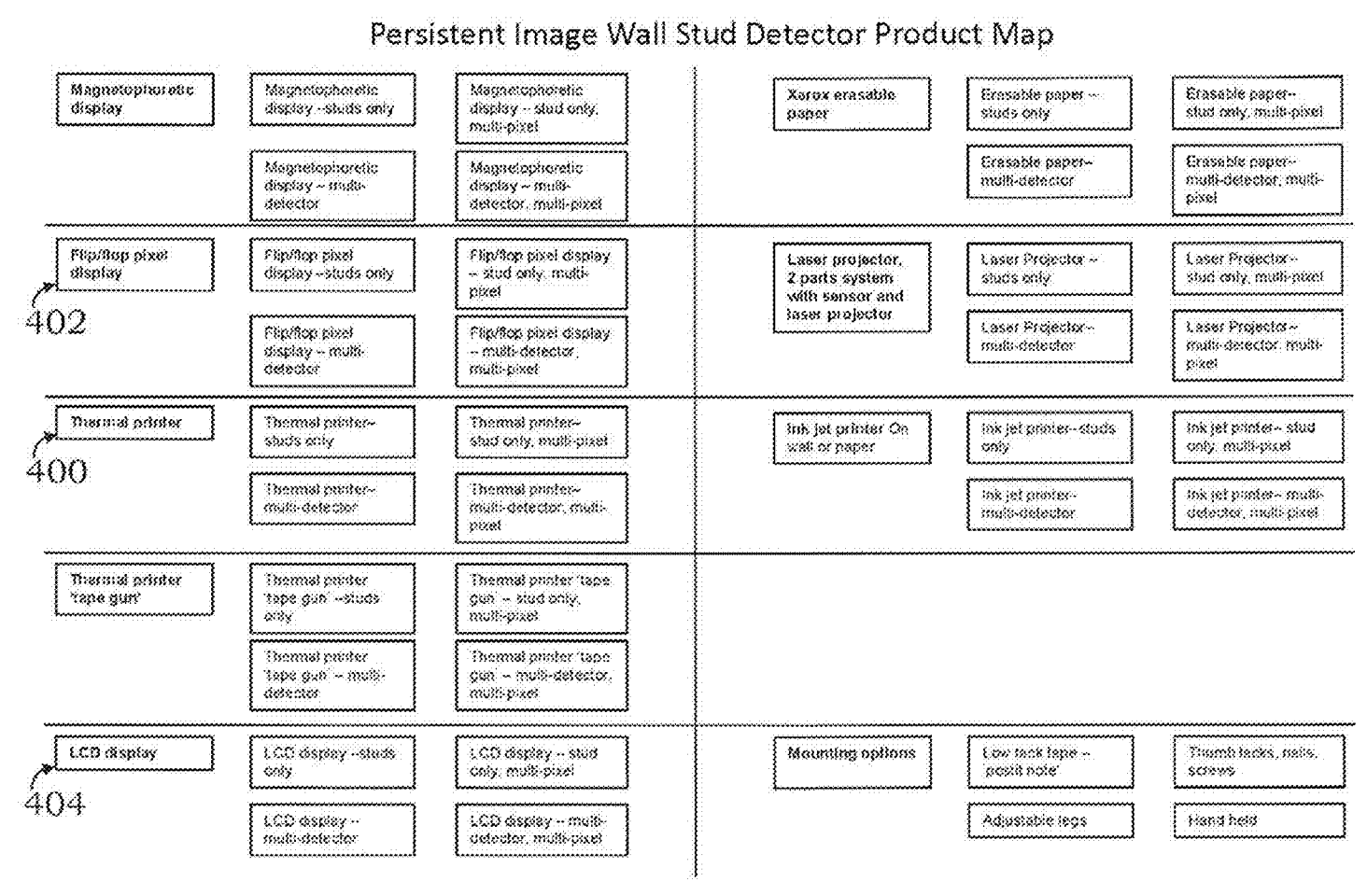
Figure 9B:
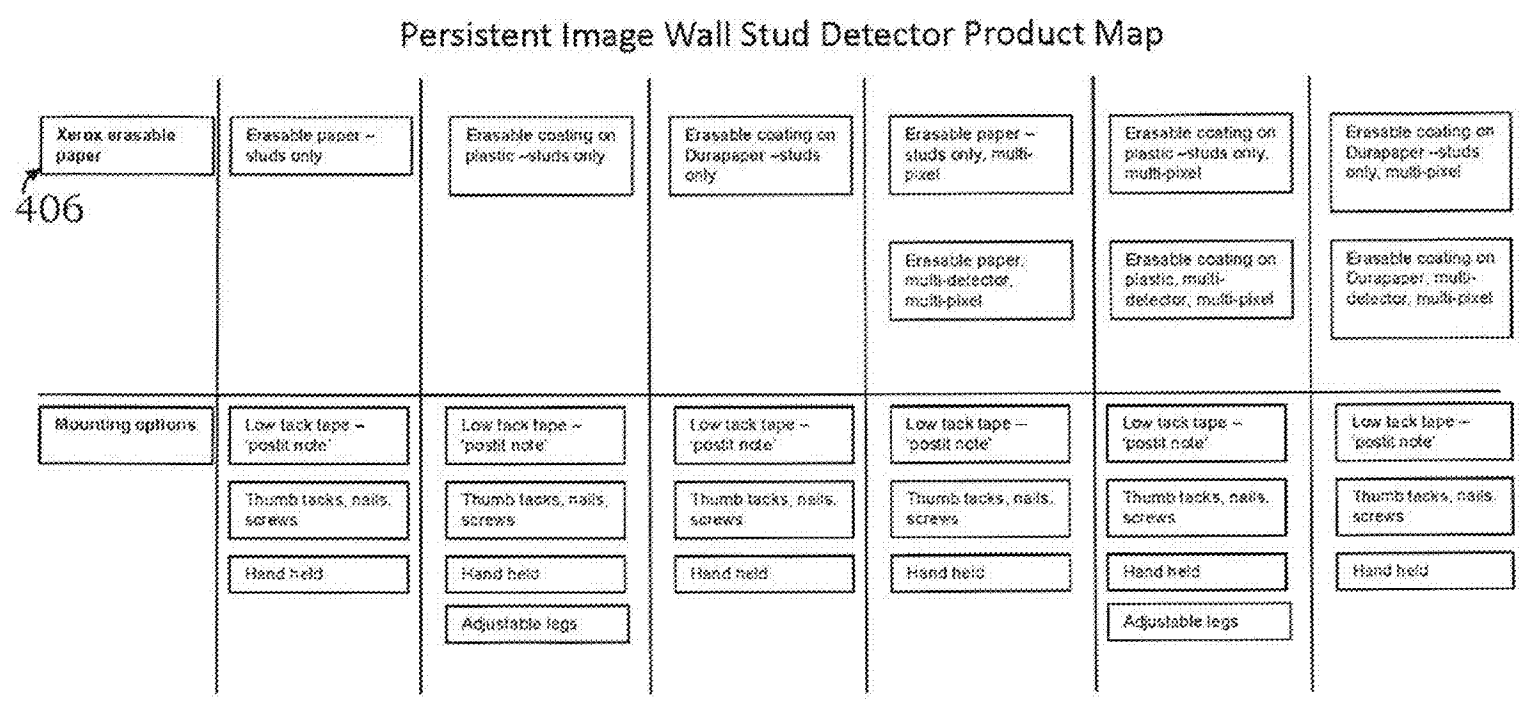

Referring to FIG. 9A and FIG. 9B there is shown in a tabular form the various embodiments of the invention that can be created. For example, in one embodiment of the invention 400 there is an electronic wall stud detector with the addition of circuitry that triggers a thermal print head. The display panel comprises a strip of thermal paper. The display paper strip would be attached to the base to be attached to the wall surface mechanically or with low tack adhesive or other semi-permanent means. The print head transforms the thermal ink coating on the paper into its dark state creating a high contrast image when detecting a sub-wall feature. Using a multi-element thermal print head will produce a pixelated display of the wall's subsurface feature. The image is permanent on the thermal paper and therefore the paper strip would be replaced after use.

In another embodiment of the invention 402 the electronic stud detector activates a magnetic coil and the display panel is a magnetic flip/flop pixel panel that contains magnetically sensitive particles suspended in a gel or fluid. Upon application of a magnetic field the magnetic sensitive particles will change colour due to the change in orientation of the particles in the panel. The magnetic coil would be triggered either with two signals to indicate the presence of two distinct subsurface features such as wall studs and electric wiring. By changing the orientation of the magnetic field either of the two colours can be displayed on the display panel which is a magnetic flip/flop display panel.

In another embodiment of the invention the electronic wall stud detector uses an inkjet print head that prints an image on a strip of self-adhesive paper over the area of interest on the wall. The display paper strip would be attached to the wall using low tack adhesive. The print head would print the beneath-wall object image on the adhesive strip of paper or produce a pixelated display of the wall's subsurface features. The paper strip would be replaced after each use.

In still another embodiment of the invention the print head is a multiple inkjet print head using different colours. The colours would be able to distinguish the different types of sub-wall objects such as a beneath-wall stud or a beneath-wall electrical wiring or plumbing feature.

In another embodiment of the invention the display panel is a strip of non-porous "wipe off" type material such as a polymer sheet. The display surface would be attached to the wall surface with low tack adhesive tape or mechanical means. The print head would print images on the display strip corresponding to what the sensor detected creating a high contrast image. The print head would produce a pixelated display of the wall's subsurface features.

In one more embodiment of the invention 404 the electronic wall stud detector triggers an output based on the intensity of sensor signals thereby creating a display image on a full size LCD display.

In another embodiment of the invention 406 the printing head relies upon the use of an erasable or permanent marking media.

In yet another embodiment the print head would spray dust which when applied to the wall changes colour through the exposure of ultraviolet light.

Figure 10A:
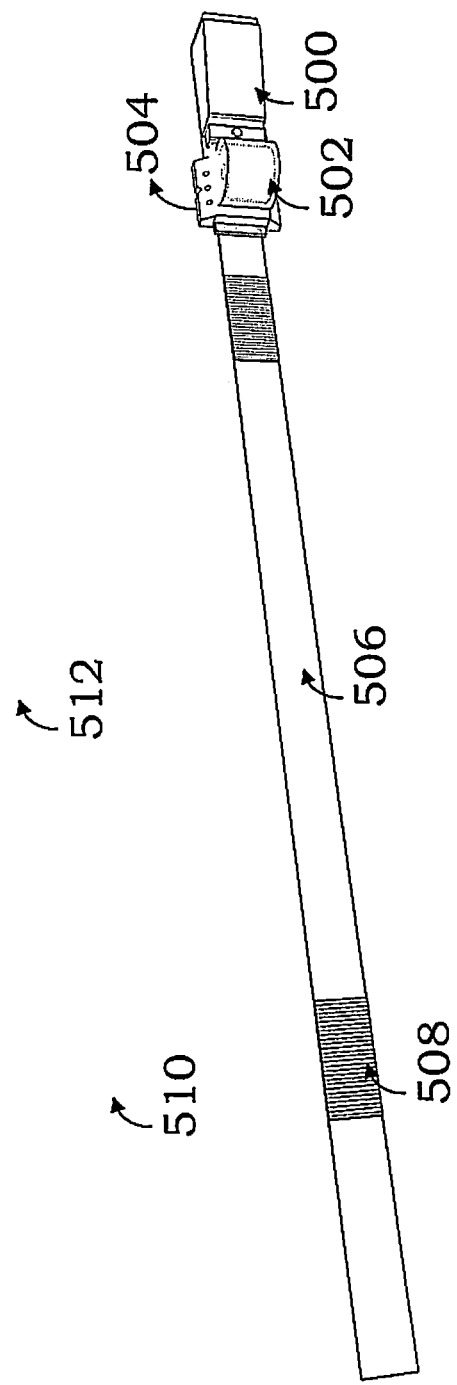
FIG. 10A is yet another embodiment of the invention that dispenses paper.

Referring to FIG. 10A and in yet another embodiment of the invention 500 the scanner head 502 will print the images 508 of the sub-wall objects 510 on a strip of printing paper 506 and will dispense it from the scanning head 504. The paper, as it is dispensed from the scanning head would adhere to the surface of the wall using a low tack adhesive.

Figure 10B:
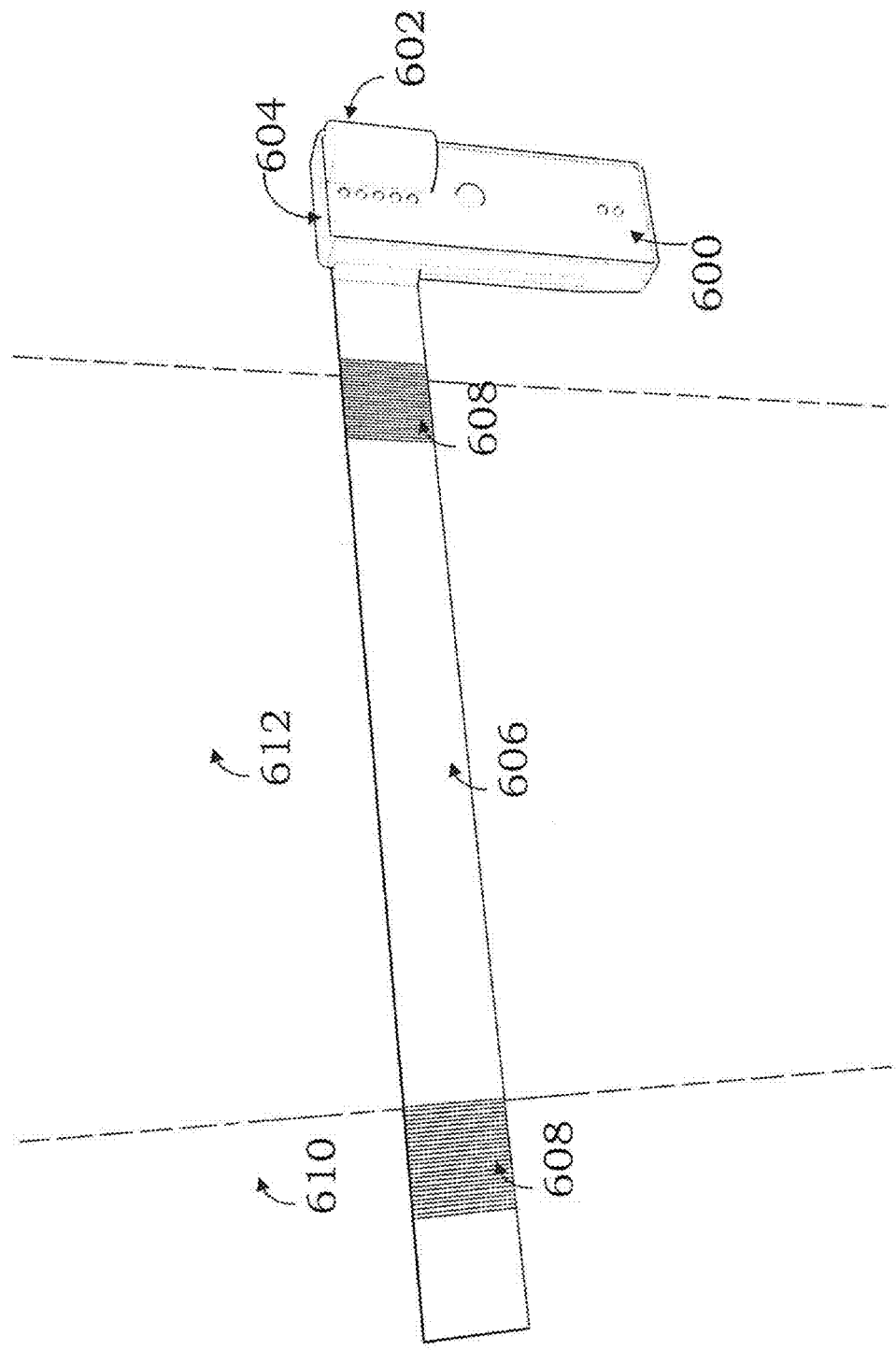
FIG. 10B is another embodiment of the paper dispensing invention shown in FIG. 10A.

Referring to FIG. 10B and in still another embodiment of the invention 600 the image 608 is printed on an erasable coating technology such as Durapaper® 606. The coated panel 606 would be held to the wall surface 612 with mechanical or other means and dispensed from a magazine 602. An electronic wall stud sensor 602 would project an image representing the sub-surface wall feature 610 and display it on the paper.

Thus it can be seen by the reader that the present invention and its various embodiments can be used to provide a persistent image of a beneath-wall object of interest. The invention is convenient, portable, consumes little power and can operate in a variety of ways.

Although the description of the invention presented herein contains much specificity, these should not be construed as limiting the scope of the embodiments but merely providing illustrations of some of the several embodiments. The scope of the embodiments should be determined by the appended claims and their legal equivalents.

What is claimed is:

1. An electronic device for detecting an object beneath a wall section of interest, said electronic device comprising:
   a. a first part comprising an image generator for generating a repeating series of persistent visual elements over said wall section of interest;
   b. a second part comprising a remote and moveable part in communication with said first part, said second part comprising:
      i. a first sensor for scanning said wall section of interest and for sensing said object and generating a first signal when the object is present and a second signal when the object is not present;
      ii. a second sensor for detecting said repeating series of persistent visual elements and generating a third signal when the repeating series of persistent visual elements are detected;
      iii. a first controller for receiving said first signal and said third signal and for generating a fourth signal for transmission to the first part so that said stationary image generator maintains illuminated said repeating series of persistent visual elements over the object; and,
      iv. said first controller for receiving said second signal and said third signal and for generating a fifth signal for transmission to the first part so that the stationary image generator extinguishes the repeating series of persistent visual elements when no object is present;
   c. the result being that a persistent image is displayed on the wall section of interest indicative of the presence of the object located beneath the wall section of interest.

2. The electronic device of claim 1 wherein the image generator is a stationary light projector and wherein the electronic device is a stud finder.

3. The electronic device of claim 2 wherein said light projector is a laser projector comprising a laser emitter, a laser shutter and a second controller for controlling said laser emitter and said laser shutter for generating the repeating series of persistent visual elements.

4. The electronic device of claim 3 wherein said laser projector is tri-pod mounted a predetermined distance from the wall section of interest.

5. The electronic device of claim 4 wherein the second part is hand-held by a user.

6. The electronic device of claim 5 wherein the second part communicates with the first part by wire.

7. The electronic device of claim 5 wherein the second part communicates with the first part by a wireless means.

8. The electronic device of claim 1 wherein the first sensor comprises a single sensor for detecting a wall stud.

9. The electronic device of claim 1 wherein the first sensor comprises a plurality of sensors for detecting a plurality of objects comprising the following objects: a wall stud, an electric wire and a plumbing fixture.

10. The electronic device of claim 9 wherein said plurality of objects is disposed a respective plurality of depths beneath a wall surface.

11. The electronic device of claim 1 wherein the first part is combined with the moveable second part to form a single housing.

12. The electronic device of claim 11 wherein said single housing is mounted in a sliding relationship over a base.

13. The electronic device of claim 12 wherein said base is an elongate rectangular body for temporary fixed placement over the wall section of interest and wherein said elongate rectangular body comprises a first end, a second end, a front face visible to a user and a rear face disposed against the wall section of interest.

14. The electronic device of claim 13 wherein the image generator is a magnetophoretic image generator.

15. The electronic device of claim 14 wherein a display for displaying a magnetophoretic image is mounted to said front face.

16. The electronic device of claim 13 wherein said display is comprises a colour flip-flop pixel display.

17. The electronic device of claim 13 wherein the display is a thermal printer.

18. The electronic device of claim 13 wherein the display is a LCD display.

19. The electronic device of claim 13 wherein the display is thermal printer tape gun.

* * * * *